(12) United States Patent
Jacobson et al.

(10) Patent No.: US 9,923,648 B1
(45) Date of Patent: Mar. 20, 2018

(54) SYSTEM AND METHOD FOR DISTINGUISHING ADS-B OUT FUNCTION FAILURES FROM TRANSPONDER FAILURES

(71) Applicant: Rockwell Collins, Inc., Cedar Rapids, IA (US)

(72) Inventors: Randy H. Jacobson, Melbourne, FL (US); Matthew S. Erickson, Melbourne, FL (US); Karen R. Beauchamp, Titusville, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 328 days.

(21) Appl. No.: 14/724,609

(22) Filed: May 28, 2015

(51) Int. Cl.
*H04B 17/29* (2015.01)
*G01S 13/74* (2006.01)
*G08G 5/04* (2006.01)

(52) U.S. Cl.
CPC .............. *H04B 17/29* (2015.01); *G01S 13/74* (2013.01); *G08G 5/04* (2013.01)

(58) Field of Classification Search
CPC ................................ H04B 17/29; G01S 13/74

USPC ......................................................... 342/165
See application file for complete search history.

(56) References Cited

U.S. PATENT DOCUMENTS

| | | | |
|---|---|---|---|
| 2003/0137444 A1* | 7/2003 | Stone | G08G 5/0008 342/30 |
| 2007/0018881 A1* | 1/2007 | King | G08G 5/006 342/46 |
| 2012/0001788 A1* | 1/2012 | Carlson | G01S 13/784 342/30 |
| 2013/0307717 A1* | 11/2013 | Watson | G01S 13/9303 342/37 |

* cited by examiner

*Primary Examiner* — Timothy A Brainard
(74) *Attorney, Agent, or Firm* — Angel N. Gerdzhikov; Donna P. Suchy; Daniel M. Barbieri

(57) ABSTRACT

Systems and methods for testing and distinguishing ADS-B Out function failures from transponder failures are disclosed. The system may include a transponder configured to: detect a test signal on an electronic interface coupled with the transponder; in response to a detection of the test signal, determine whether the transponder is experiencing a transponder failure or an Automatic Dependent Surveillance-Broadcast (ADS-B) Out function failure; and for a predetermined period of time starting from the detection of the test signal, report a failure signal to only when it is determined that the transponder is experiencing the transponder failure.

20 Claims, 3 Drawing Sheets

SYSTEM AND METHOD FOR DISTINGUISHING ADS-B OUT FUNCTION FAILURES FROM TRANSPONDER FAILURES

BACKGROUND

Automatic Dependent Surveillance-Broadcast, or ADS-B, is a cooperative surveillance technology in which an aircraft periodically broadcasts its position, velocity, and flight identification, allowing for the aircraft to be tracked. This periodic broadcast is typically referred to as "ADS-B Out". The information can be received by air traffic control ground stations, and can also be received by other aircraft to provide situational awareness and allow self separation. The receipt of another aircraft's broadcast is typically referred to as "ADS-B In".

The ADS-B Out function is usually performed by an onboard transponder. A transponder (short for transmitter-responder, and sometimes abbreviated to XPDR) is an electronic device that produces a response when it receives a radio-frequency interrogation. Other systems onboard the aircraft, such as traffic collision avoidance system (TCAS) or the like, may also use the transponder as a means of detecting aircraft at risk of colliding with each other.

The addition of the ADS-B Out function to the transponder brought with it the requirement to have an ADS-B Out function failure annunciation and an ADS-B Out device failure annunciation. As the ADS-B Out function is within the transponder, the ADS-B Out device failure requirement is fulfilled by an existing transponder failure indication where the transponder may self report when a failure is experienced.

There are two methods by which the ADS-B Out function failure may be indicated. One method is the addition of a new failure annunciation in the cockpit. Due to the expense of adding new indications, this method is not preferred for many existing aircraft installations. The other method is to combine the ADS-B Out function failure with the transponder failure, provided that a user (e.g., a pilot) can determine which failure is present.

Currently, when a failure occurs, an indicator is provided to notify a user (e.g., a pilot) of the failure. However with a combined transponder/ADS-B Out failure indication, the indicator does not specify whether the failure was caused by a transponder failure or an ADS-B Out function failure. In order to determine the source of the failure, the user may need to observe if another system using the transponder (e.g., the TCAS) is also failed. If the TCAS still functions properly, it may suggest that the transponder also functions properly, and the user may determine the source of the failure to be an ADS-B Out function failure. On the other hand, if the TCAS fails to function properly, the user may determine the source of the failure to be a transponder failure.

It is noted, however, that this determination can be misleading in some cases. For instance, if the TCAS has failed for another reason (such as the lack of a valid radio altitude input) instead of a failed transponder, the user may incorrectly conclude that the failure was caused by the transponder using the current test procedure. Therein lies a need for systems and methods for distinguishing ADS-B function failures from transponder failures without the aforementioned shortcomings.

SUMMARY

In one aspect, embodiments of the inventive concepts disclosed herein are directed to a transponder. The transponder may include a data interface and at least one processor coupled with the data interface. The data interface may be configured to receive a signal, and the at least one processor may be configured to: determine whether the signal is a test signal; in response to the signal being the test signal, determine whether the transponder is experiencing a transponder failure or an Automatic Dependent Surveillance-Broadcast (ADS-B) Out function failure; and for a predetermined period of time starting from a time when the test signal is received, report a failure signal only when it is determined that the transponder is experiencing the transponder failure.

In a further aspect, embodiments of the inventive concepts disclosed herein are directed to a system. The system may include a failure indicator and at least one transponder in communication with the failure indicator. The at least one transponder may be configured to: detect a test signal on an electronic interface coupled with the at least one transponder; in response to a detection of the test signal, determine whether the at least one transponder is experiencing a transponder failure or an Automatic Dependent Surveillance-Broadcast (ADS-B) Out function failure; and for a predetermined period of time starting from the detection of the test signal, send a failure signal to the failure indicator only when it is determined that the at least one transponder is experiencing the transponder failure.

In another aspect, embodiments of the inventive concepts disclosed herein are directed to a method. The method may include: detecting, by at least one processor, a test signal received by a transponder onboard an aircraft; determining, by the at least one processor, whether the transponder is experiencing a transponder failure or an Automatic Dependent Surveillance-Broadcast (ADS-B) Out function failure; and for a predetermined period of time starting from a time when the test signal is detected, reporting, by the at least one processor, a failure signal only when it is determined that the transponder is experiencing the transponder failure.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, examples of which are illustrated in the accompanying drawings.

Embodiments in accordance with the inventive concepts disclosed herein are directed to systems and methods for testing and distinguishing ADS-B Out function failures from transponder failures onboard an aircraft. The test procedures disclosed herein are simple and intuitive, and utilizes existing components (e.g., failure indictors, test buttons, and the like) that are already familiar to the users. It is contemplated that implementing the test procedures in such manners may minimize behavioral changes required of the users while providing accurate indications regarding the types of failures. The test procedures may be implemented on new aircraft, but may also be easily retrofitted into existing aircraft electronic systems.

Figure 1:
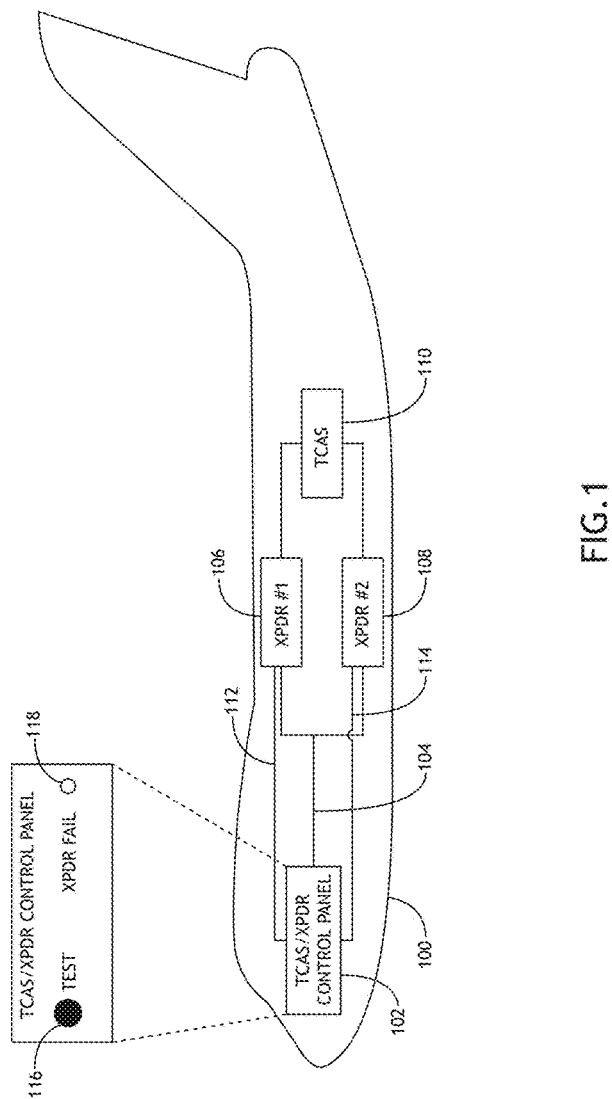
FIG. 1 is a block diagram depicting an exemplary aircraft according to an exemplary embodiment of the inventive concepts disclosed herein.

Referring to FIG. 1, a simplified illustration depicting an exemplary aircraft 100 is shown. The exemplary aircraft 100 may include a pair of transponders (XPDR) 106 and 108, only one of which is typically selected to be active at a time. The aircraft 100 may also include a traffic collision avoidance system (TCAS) 110 and a TCAS/XPDR control panel 102. As depicted in FIG. 1, the control panel 102 may include a test interface (e.g., a test button or switch) 116 and a XPDR failure indicator 118. It is to be understood that the test interface 116 and the XPDR failure indicator 118 are not required to be physically located within the control panel 102 as shown. For instance, the XPDR failure indicator 118 may be located elsewhere in the cockpit and still serve the same purpose. Similarly, the test interface 116 may be located at a different location without departing from the broad scope of the inventive concepts disclosed herein. However, for purposes of presentation simplicity, both the test interface 116 and the XPDR failure indicator 118 are shown together on the control panel 102.

Typically, the control panel 102 only shows the failure indication from a transponder that is selected to be active. The control panel 102 may include a control circuitry that may send information, including a test signal, to the transponders 106 and 108 via an electronic interface 104. Some of the information, such as a test signal, may be intended for the TCAS 110. If a failure has occurred, a failure signal (indicating a failure state) may be sent back to the control panel 102 via electronic interfaces 112 and 114. A notification may then be annunciated on the XPDR failure indicator 118 to notify a user (e.g., a pilot). Such a failure may have been caused by either an ADS-B Out function failure or a transponder failure. However, the notification alone may not provide sufficient information for the user to determine the exact cause of the failure.

To help the user determine whether the failure was caused by an ADS-B Out function failure or a transponder failure, the transponders 106 and 108 in accordance with the inventive concepts disclosed herein may be configured to appropriate a test signal passing through the transponders 106 and 108 and conditionally report failure signals back to the control panel 102 via the electronic interfaces 112 and 114 based on the type of failure that has occurred. More specifically, the transponders 106 and 108 may monitor the signals on the electronic interface 104 and detect when a TCAS test signal intended for testing the TCAS 110 is being sent to the TCAS 110. Once a TCAS test signal is detected, each transponder 106 and 108 may decide whether or not to conditionally report a failure signal back to the control panel 102. The condition may specify that for a predetermined period of time after detecting the TCAS test signal, a failure signal can be reported back to the control panel 102 only if the failure was caused by a transponder failure. In other words, if there is a transponder failure, the transponders 106 and 108 may continue to report failure signals back to the control panel 102, effectively retaining the failure indication on the XPDR failure indicator 118. On the other hand, if the failure was caused solely by an ADS-B Out function failure, the transponders 106 and 108 may temporarily withhold failure reporting for the predetermined period of time, effectively removing the failure indication on the XPDR failure indicator 118 for the predetermined period of time. The predetermined period of time in an exemplary implementation may be eight seconds, which corresponds to the amount of time that the TCAS 110 may take to perform its test. The transponders 106 and 108 may start reporting failure signals to the control panel 102 again at the end of the predetermined period of time after detecting the TCAS test signal.

Figure 2:
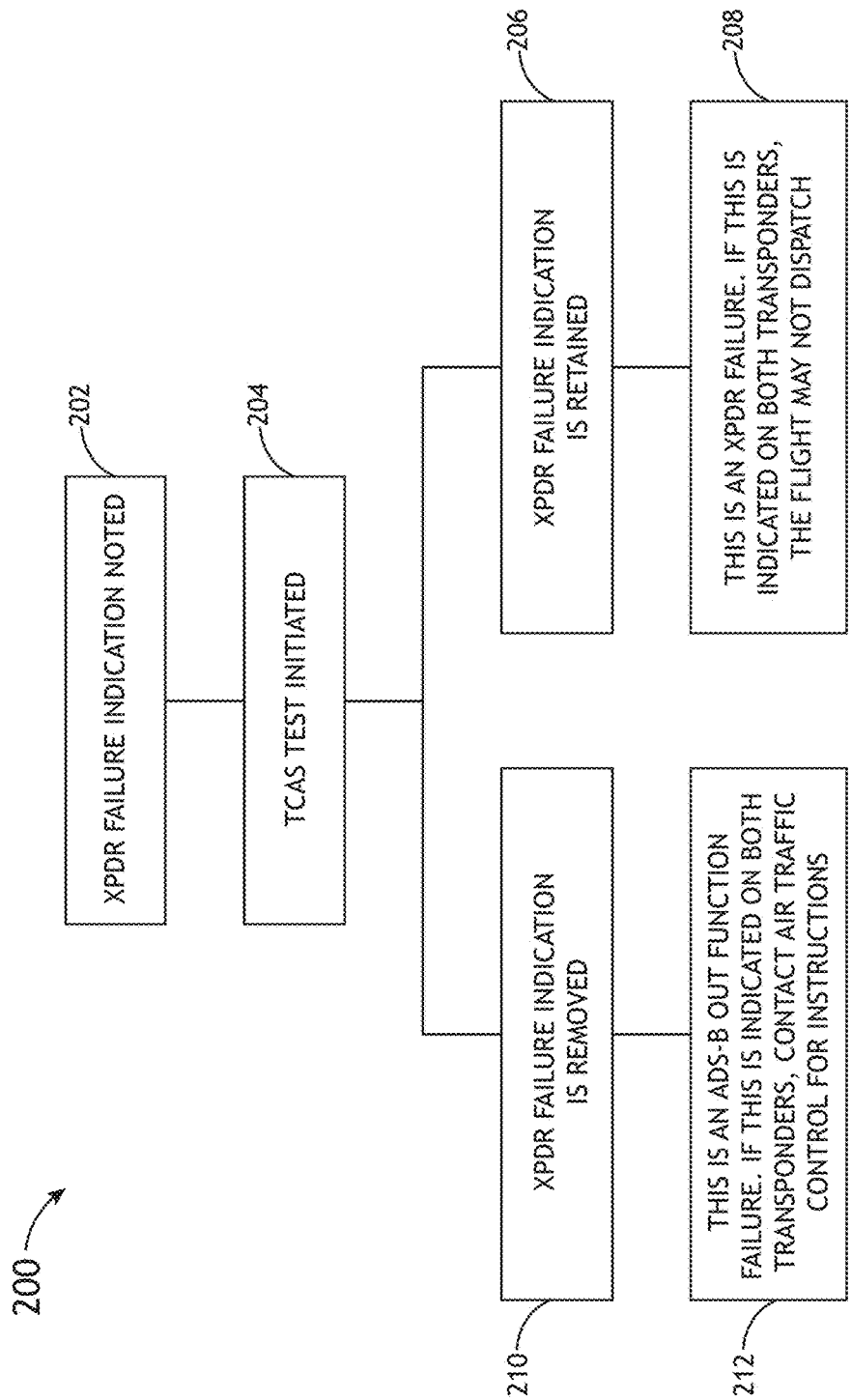
FIG. 2 is a flow diagram depicting a method for testing and distinguishing a transponder failure from an ADS-B Out function failure according to an exemplary embodiment of the inventive concepts disclosed herein.

FIG. 2 is a flow diagram depicting an embodiment of a typical test procedure 200 that may be performed utilizing the transponders 106 and 108 previously described. Referring generally to FIGS. 1 and 2, upon receiving a notification on the XPDR failure indicator 118 that a failure has occurred (step 202), a user may initiate a TCAS test (step 204) to determine whether the failure indicated was caused by an ADS-B Out function failure or a transponder failure. Initiating the TCAS test causes a TCAS test signal to be sent from the control panel 102 to the TCAS 110 via the transponders 106 and 108. The transponders 106 and 108 may detect the TCAS test signal and decide whether or not to conditionally report failure signals back to the control panel 102 as described above.

From the user's perspective, if the failure signal indicated on the XPDR failure indicator 118 continues to be retained (step 206) within the first eight seconds after initiating the TCAS test (i.e., at least one of the transponders 106 and 108 continues to report a failure signal back to the control panel 102), the failure indicated on the XPDR failure indicator 118 must be a transponder failure. On the other hand, if the failure signal indicated on the XPDR failure indicator 118 is temporarily removed (step 210) for the first eight seconds after initiating the TCAS test (i.e., failure signals are being temporarily withheld by the transponders 106 and 108), the failure must be an ADS-B Out function failure.

It is contemplated that further determinations may be made based on whether one or both transponders 106 and 108 are reporting failure signals in the first eight seconds after initiating the TCAS test. For instance, if both transponders 106 and 108 are reporting failure signals in the first eight seconds after initiating the TCAS test, then both transponders 106 and 108 may have failed and a determination may be made that prohibits the dispatch of the aircraft (step 208). Similarly, if both transponders 106 and 108 are withholding failure signals for the first eight seconds after initiating the TCAS test, ADS-B Out functions in both transponders 106 and 108 may have been lost and a determination may be made to request further instructions (e.g., from air traffic control) (step 212).

It is contemplated that the determined actions mentioned above (e.g., steps 208 and 212) are merely exemplary. It is to be understood that additional and/or alternative actions and protocols may be followed in response to the specific type of failure identified. It is also to be understood that the specific reference to eight seconds as the predetermined period of time is not meant to be limiting. The predetermined period of time may vary without departing from the broad scope of the inventive concepts disclosed herein.

It is also contemplated that while the exemplary aircraft 100 is shown to include two transponders 106 and 108, the same test procedure 200 is applicable to an aircraft with a different number of transponders without departing from the broad scope of the inventive concepts disclosed herein. It is also to be understood that the specific references to the TCAS 110 is not meant to be limiting. It is contemplated that an electronic unit that is connected to the transponders 106 and 108 in the same manner as the TCAS 110 and can receive a test signal through the transponders 106 and 108 in the same manner as previously described may be utilized to facilitate the test procedure 200 without being designated as the traffic collision avoidance system. Alternatively, the test signal is not required to be destined for another electronic unit. In other words, the test signal may be a dedicated signal intended for the transponders 106 and 108 specifically for the purpose of triggering the test procedure 200 and/or its related processes. It is also to be understood that the specific references to aircraft are exemplary. It is contemplated that the exemplary systems depicted above may be installed on various types of vehicles, including manned or unmanned aerial vehicles, land vehicles, maritime vehicles, as well as space vehicles.

It is further contemplated that one or more steps of the test procedure 200 may be systematically performed. For instance, a control circuitry located on the control panel 102 (or another electronic unit onboard the aircraft) may be configured to automatically send out a TCAS test signal (step 204) when a XPDR failure is initially reported. The control panel 102 may then wait for responses from the transponders 106 and 108. If the transponders 106 and 108 continue to report failure signals (step 206), the control panel 102 may recognize this as a XPDR failure and automatically proceed to the take appropriate actions defined for handling XPDR failures (step 208). On the other hand, if no failure signal is reported by the transponders 106 and 108 for the predetermined period of time (step 210), the control panel 102 may recognize this as an ADS-B Out function failure and automatically proceed to the take appropriate actions defined for handling ADS-B Out function failures (step 212). It is contemplated that the control panel 102 may continue to notify the user through the XPDR failure indicator 118 as previously described. The user may also be provided with an option to halt, intervene, or override the automated test procedure in certain implementations.

Figure 3:
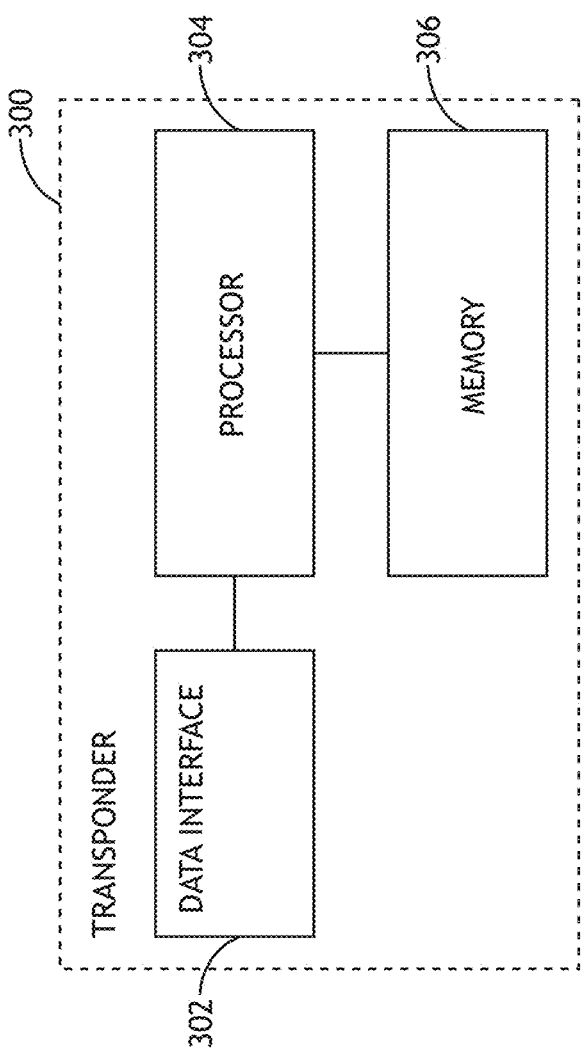
FIG. 3 is a block diagram depicting an exemplary transponder according to an exemplary embodiment of the inventive concepts disclosed herein.

FIG. 3 is a block diagram depicting a more detailed view of a transponder 300 (corresponds to the transponder 106/108 in FIG. 1) in accordance with the inventive concepts disclosed herein. Referring generally to FIGS. 1 and 3, the transponder 300 may include at least one data interface 302 in communication with the control panel 102 and the TCAS 110. The transponder 300 may also include at least one processor 304. The at least one processor 304 may be implemented as a set of control circuits, a dedicated processing unit, an application-specific integrated circuit (ASIC), an integrated component of an existing hardware or firmware configured to control operations of the transponder 300, or various other types of processors or processing units. It is contemplated that the at least one processor 304 may be in communication with a non-transitory processor-readable memory 306 configured to store processor-executable code and data. When the processor-executable code is executed by the at least one processor 304, the at least one processor 304 may carry out the various functions required of the transponder 300. More specifically, the at least one processor 304 may be configured to monitor the signals received from the control panel 102, detect whether a signal received from the control panel 102 is a TCAS test signal, and determine whether or not to conditionally report a failure signal back to the control panel 102 based on the type (i.e., cause) of the failure experienced by the transponder 300.

It is to be understood that the embodiments of the inventive concepts disclosed herein may be conveniently implemented in forms of a software, hardware or firmware package. It is to be understood that embodiments of the inventive concepts described in the present disclosure are not limited to any underlying implementing technology. Embodiments of the inventive concepts of the present disclosure may be implemented utilizing any combination of software and hardware technology and by using a variety of technologies without departing from the broad scope of the inventive concepts or without sacrificing all of their material advantages.

It is to be understood that the specific order or hierarchy of steps in the processes disclosed is an example of exemplary approaches. It is to be understood that the specific order or hierarchy of steps in the processes may be rearranged while remaining within the broad scope of the present disclosure. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A transponder, comprising:
a data interface configured to receive a signal; and
at least one processor coupled with the data interface, the at least one processor configured to:
determine whether the signal is a test signal;
in response to the signal being the test signal, determine whether the transponder is experiencing a transponder failure or an Automatic Dependent Surveillance-Broadcast (ADS-B) Out function failure; and
for a predetermined period of time starting from a time when the test signal is received, report a failure signal only when it is determined that the transponder is experiencing the transponder failure.

2. The transponder of claim 1, wherein the at least one processor is further configured to:
report the failure signal when the transponder is experiencing either the transponder failure or the ADS-B Out function failure after lapse of the predetermined period of time.

3. The transponder of claim 1, wherein the test signal is a traffic collision avoidance system (TCAS) self test signal.

4. The transponder of claim 1, wherein the predetermined period of time is eight seconds.

5. A system, comprising:
a failure indicator; and
at least one transponder in communication with the failure indicator, the at least one transponder is configured to:
detect a test signal on an electronic interface coupled with the at least one transponder;
in response to a detection of the test signal, determine whether the at least one transponder is experiencing a transponder failure or an Automatic Dependent Surveillance-Broadcast (ADS-B) Out function failure; and for a predetermined period of time starting from the detection of the test signal, send a failure signal to the failure indicator only when it is determined that the at least one transponder is experiencing the transponder failure.

6. The system of claim 5, wherein the at least one transponder is further configured to:

send the failure signal to the failure indicator when the transponder is experiencing either the transponder failure or the ADS-B Out function failure after lapse of the predetermined period of time.

7. The system of claim 5, wherein the failure indicator is configured to:

provide an indication of a failure during the predetermined period of time only when the failure signal is received during the predetermined period of time.

8. The system of claim 5, wherein the failure indicator is configured to:

temporarily remove an indication of a failure for the predetermined period of time to indicate that the transponder is experiencing the ADS-B Out function failure.

9. The system of claim 5, wherein the failure indicator and the at least one transponder are installed on an aircraft.

10. The system of claim 9, wherein the at least one transponder includes a plurality of transponders coupled with a traffic collision avoidance system (TCAS).

11. The system of claim 10, wherein the test signal is a TCAS self test signal.

12. The system of claim 5, wherein the predetermined period of time is eight seconds.

13. A method, comprising:

detecting, by at least one processor, a test signal received by a transponder onboard an aircraft;

determining, by the at least one processor, whether the transponder is experiencing a transponder failure or an Automatic Dependent Surveillance-Broadcast (ADS-B) Out function failure; and for a predetermined period of time starting from a time when the test signal is detected, reporting, by the at least one processor, a failure signal only when it is determined that the transponder is experiencing the transponder failure.

14. The method of claim 13, further comprising:

reporting, by the at least one processor, the failure signal when the transponder is experiencing either the transponder failure or the ADS-B Out function failure after lapse of the predetermined period of time.

15. The method of claim 13, further comprising:

providing a failure annunciation to a user during the predetermined period of time to indicate that the transponder is experiencing the transponder failure.

16. The method of claim 13, further comprising:

temporarily removing a failure annunciation for the predetermined period of time to indicate that the transponder is experiencing the ADS-B Out function failure.

17. The method of claim 13, wherein the test signal is initiated in response to a user request.

18. The method of claim 13, wherein the test signal is initiated in response to a self reported failure by the at least one transponder.

19. The method of claim 13, wherein the transponder is coupled with a traffic collision avoidance system (TCAS) and wherein the test signal is a TCAS self test signal.

20. The method of claim 13, wherein the predetermined period of time is eight seconds.

* * * * *